United States Patent
Shiva et al.

(10) Patent No.: US 9,407,514 B2
(45) Date of Patent: Aug. 2, 2016

(54) VIRTUAL MACHINE PLACEMENT

(75) Inventors: SM Prakash Shiva, Bangalore (IN); Raman Ramteke Venkatesh, Bangalore (IN); Jerome Rolia, Kanata (CA); Mustazirul Islam, Rocklin, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 170 days.

(21) Appl. No.: 14/131,446

(22) PCT Filed: Jul. 11, 2011

(86) PCT No.: PCT/US2011/043537
§ 371 (c)(1),
(2), (4) Date: Jan. 8, 2014

(87) PCT Pub. No.: WO2013/009287
PCT Pub. Date: Jan. 17, 2013

(65) Prior Publication Data
US 2014/0149986 A1 May 29, 2014

(51) Int. Cl.
G06F 9/44 (2006.01)
H04L 12/24 (2006.01)
G06F 9/455 (2006.01)
(Continued)

(52) U.S. Cl.
CPC ........ H04L 41/5003 (2013.01); G06F 9/45533 (2013.01); G06F 9/45558 (2013.01); G06F 9/505 (2013.01); G06F 9/5077 (2013.01); G06F 9/5083 (2013.01); G06F 11/3419 (2013.01); G06F 11/3466 (2013.01); G06F 11/3688 (2013.01); G06F 2009/4557 (2013.01)

(58) Field of Classification Search
CPC ............ G06F 11/3419; G06F 11/3466; G06F 11/3688; G06F 2201/865
See application file for complete search history.

(56) References Cited

U.S. PATENT DOCUMENTS 6,119,174 A * 9/2000 Borowsky ........... G06F 11/3452
702/186
7,668,703 B1 * 2/2010 Rolia ..................... G06Q 10/04
703/2
(Continued)

OTHER PUBLICATIONS

Lu et al., "QoS-Aware VM placement in Multi-Domain Service Level Agreements Scenarios", 2013 IEEE, Cloud, 2013 IEEE Sixth International Conference, Jun. 28-Jul. 3, 2013; pp. 661-668; <http://ieeexplore.ieee.org/xpls/abs_all.jsp?arnumber=6676754&tag=1>.*

(Continued)

*Primary Examiner* — Thuy Dao
*Assistant Examiner* — Ben C Wang
(74) *Attorney, Agent, or Firm* — Hewlett Packard Enterprise Patent Department

(57) ABSTRACT

Methods, apparatus, and computer readable media with executable instructions stored thereon for virtual machine placement are provided. A user's demands on execution of a number of tasks, each task including a demand trace, can be defined as Service Level Agreement (SLA) information, including one or more Class of Service (CoS) levels defined by a Base Resource Entitlement (BRE) criteria and a Reserved Resource Entitlement (RRE) criteria (222). A highest CoS level of the one or more CoS levels can be selected (224) and the tasks within the Cos level can be load-balanced across a pool of servers (226). At least a portion of the RRE criteria can be removed from the demand trace of the selected CoS level (228). The selecting, load-balancing, and removing steps can be repeated until there are no more CoS levels (230).

18 Claims, 4 Drawing Sheets

(51) Int. Cl.
*G06F 9/50* (2006.01)
*G06F 11/34* (2006.01)
*G06F 11/36* (2006.01)

(56) References Cited

U.S. PATENT DOCUMENTS

| | | | | |
|---|---|---|---|---|
| 8,024,737 | B2* | 9/2011 | Blanding | G06F 9/505 |
| | | | | 718/104 |
| 8,103,486 | B1* | 1/2012 | Rolia | G06Q 10/04 |
| | | | | 718/104 |
| 8,104,041 | B2* | 1/2012 | Belady | G06F 11/3409 |
| | | | | 718/105 |
| 8,255,915 | B1* | 8/2012 | Blanding | G06F 9/5027 |
| | | | | 709/223 |
| 8,448,181 | B2* | 5/2013 | Rolia | G06F 11/3688 |
| | | | | 717/124 |
| 9,135,074 | B2* | 9/2015 | Cherkasova | G06F 9/505 |
| 2002/0065864 | A1 | 5/2002 | Hartsell et al. | |
| 2005/0039183 | A1 | 2/2005 | Romero et al. | |
| 2005/0188075 | A1 | 8/2005 | Deas et al. | |
| 2006/0212334 | A1 | 9/2006 | Jackson et al. | |
| 2007/0233838 | A1 | 10/2007 | Takamoto et al. | |
| 2008/0028409 | A1* | 1/2008 | Cherkasova et al. | 718/104 |
| 2008/0104245 | A1* | 5/2008 | Romero | 709/226 |
| 2008/0222638 | A1 | 9/2008 | Beaty et al. | |
| 2008/0271039 | A1* | 10/2008 | Rolia et al. | 718/105 |
| 2008/0295096 | A1 | 11/2008 | Beaty et al. | |
| 2009/0276771 | A1* | 11/2009 | Nickolov et al. | 717/177 |
| 2009/0288084 | A1 | 11/2009 | Astete et al. | |
| 2010/0146503 | A1 | 6/2010 | Tsai et al. | |
| 2010/0180275 | A1 | 7/2010 | Neogi et al. | |
| 2010/0269109 | A1 | 10/2010 | Cartales | |
| 2011/0004500 | A1* | 1/2011 | Nathuji | 705/7 |
| 2011/0010721 | A1* | 1/2011 | Gupta et al. | 718/103 |
| 2012/0296852 | A1* | 11/2012 | Gmach | G06Q 10/06 |
| | | | | 705/400 |
| 2012/0304175 | A1* | 11/2012 | Damola | G06F 11/3419 |
| | | | | 718/1 |
| 2013/0263120 | A1* | 10/2013 | Patil | G06F 9/45558 |
| | | | | 718/1 |
| 2015/0143366 | A1* | 5/2015 | Suragi Math | G06F 9/5072 |
| | | | | 718/1 |

OTHER PUBLICATIONS

Goudarzi et al., "SLA-based Optimization of Power and Migration Cost in Cloud Computing", 2012 IEEE, ccgrid 2012, May 2012; pp. 172-179; <http://ieeexplore.ieee.org/stamp/stamp.jsp?tp=&arnumber=6217419>.*

Kim et al., "Virtual machines placement for network isolation in clouds", 2012 ACM, RACS'12, Oct. 2012; pp. 2473-248; <http://dl.acm.org/citation.cfm?id=2401656&CFID=765153036&CFTOKEN=49061912>.*

Garg et al., "SLA-based virtual machine management for heterogeneous workloads in a cloud datacenter", Elsevier Ltd., Aug. 2014; pp. 1-13; <http://www.cloudbus.org/papers/SLA-VMCloud-JNCA2014.pdf>.*

European Patent Office, Extended European Search Report, Dec. 11, 2014, 6 pages.

Breitgand, et al, "SLA-aware Placement of Multi-virtual Machine Elastic Services in Compute Clouds", Published: Aug. 2, 2010, IBM Research Division, Haifa Research Laboratory, Mt. Carmel 31905, Haifa, Israel, 11 pages.

Korean Intellectual Property Office, International Search Report and Written Opinion, Feb. 28, 2012, 10 pages, Daejeon, Republic of Korea.

Le, Kien et al,. "Cost-Aware Virtual Machine Placement in Cloud Computing Systems", Department of Computer Science, Rutgers University, Nov. 2010, 13 pages.

Van, et al., "SLA-aware Virtual Resource Management for Cloud Infrastructures", Published in 9th IEEE International Conference on Computer and Information Technology (CIT'09), Xiamen: China (2009), 8 pages.

* cited by examiner

VIRTUAL MACHINE PLACEMENT

BACKGROUND

With the increasing adaptation of cloud systems to run workloads various businesses seek to decrease costs by optimally using resources. A cloud system refers to computational resources that are linked through the use of computer networks. One way to manage resources in cloud systems is through the implementation of virtual machines (VMs). VMs provide a hardware independent platform on which tasks or programs are able to run. VMs can, provide flexibility for running batch or interactive jobs. A VM can be scheduled by assigning a VM to particular hardware resources.

DETAILED DESCRIPTION

Figure 1:
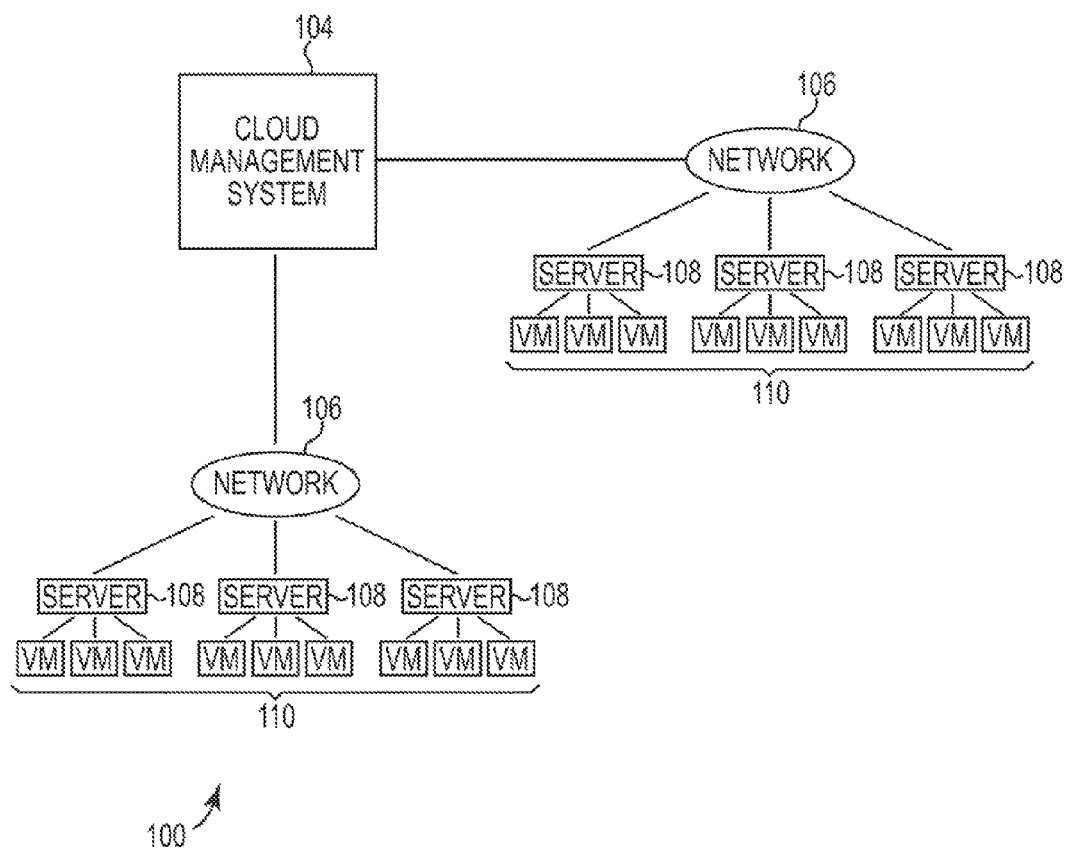
FIG. 1 illustrates a cloud system according to the present disclosure.

Methods, apparatus, and computer readable media with executable instructions stored thereon for virtual machine placement are provided. A user's demands on execution of a number of tasks, each task including a demand trace, can be defined as Service Level Agreement (SLA) information, including one or more Class of Service (CoS) levels defined by a Base Resource Entitlement (BRE) criteria and a Reserved Resource Entitlement (RRE) criteria. A highest CoS level of the one or more CoS levels can be selected and the tasks within the Cos level can be load-balanced across a pool of servers. At least a portion of the RRE criteria can be removed from the demand trace of the selected CoS level. The selecting, load-balancing, and removing steps can be repeated until there are no more CoS levels.

The figures attempt to follow a numbering convention in which the first digit corresponds to the drawing figure number and the remaining digits identify an element or component in the drawing. Similar elements or components between different figures may be identified by the use of similar digits. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates a cloud system 100 according to the present disclosure. In the cloud system 100, servers 108 or any suitable host comprising of a hardware platform, can be linked together through networks 106-1, 106-2. The allocation of tasks, jobs, or programs across a cloud system can be managed through a cloud management system 104. A task can, for example, run on a virtual machine (VM) 110. A VM can be an independent operating system within an operating system (e.g., Windows, Linux). VMs can be implemented by either software or hardware although for purposes of this disclosure software implementations can be used. VMs can use physical resources of a server 108 and provide a hardware independent platform to run tasks. VMs can be organized, by moving them across servers, to conserve cloud resources.

In one or more examples of the present disclosure, each task assigned to a VM 110 can include a historical trace of resource demands on physical resources that the task used in the past. In an example, each task can include a trace of potential future resource demands of the task. Such historical and potential future traces are referred to herein as a demand trace. A demand trace can include the historical trace, the potential future trace, and/or combinations thereof. The demand trace of each task can be partitioned across multiple segments of each task. For example, the demand trace of a task can be partitioned across different criteria of a task that dictate resource usage. Such criteria can include, but are not limited to, a Base Resource Entitlement (BRE) and/or a Reserved Resource Entitlement (RRE) criterion, as discussed herein. Further, the demand trace of each task can support load balancing functions of the task across a pool of servers.

Figure 2:
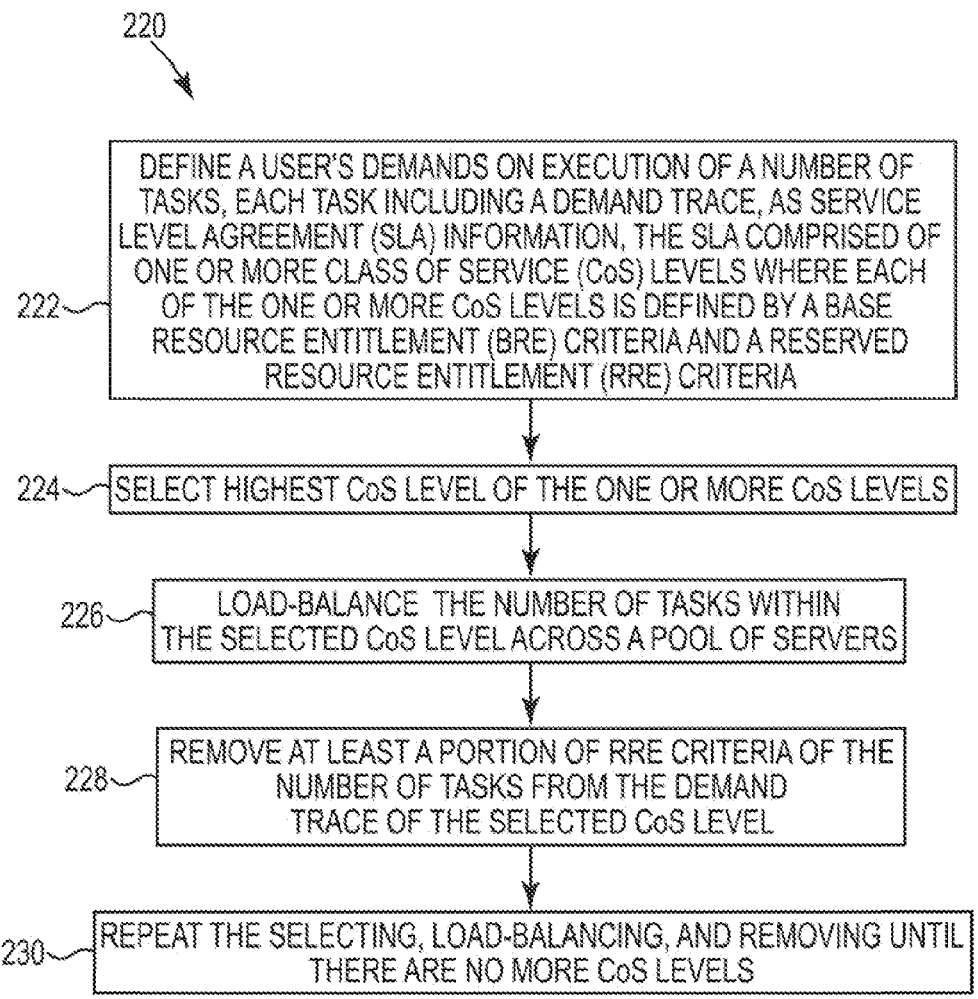
FIG. 2 is a flow chart illustrating an example of a method for virtual machine placement according to the present disclosure.

FIG. 2 is a flow chart illustrating a method 220 for virtual machine placement according to the present disclosure. The process 220 can define a task in terms of a Service Level Agreement (SLA), at 222. SLAs can define resources accessible to a task. In examples of the present disclosure, tasks can be assigned to VMs. In one or more example, a task can include a demand trace as described herein. A task can include, for example, a must-reside variable. A must-reside variable includes a variable that dictates a task's VM must reside on specific physical resources regardless of a load-balancing exercise.

An SLA of the present disclosure can include Class of Service (CoS) levels. Examples of CoS levels include, but are not limited to, Platinum, Gold, and Silver. A CoS can include one or more levels. In an example of the present disclosure, a CoS level can include a Base Resource Entitlement (BRE) criterion and a Reserved Resource Entitlement (RRE) criterion. BRE criterion can define reserved resources that a task is expected to use. RRE criterion can define reserved resources that may be needed beyond what is expected. A task that includes both a BRE criterion and a RRE criterion can initially run under the resources reserved for the tasks under BRE. If at some point it is determined that the task requires more resources, the resources reserved for the task under RRE can be used. For example, the distinction between BRE and RRE can be made to correspond with a pricing scheme. Under BRE criterion the resources reserved can be charged a fixed price. The fixed price can be independent of the actual resources used. Under RRE criterion the resources reserved can be charged on a per use basis. The more resources used under RRE criterion, for example, the more cost that can be incurred. Under the pricing scheme BRE resources can be more economical than RRE resources.

BRE and RRE criteria can be defined by a status and a resource availability value. The status can be guaranteed, best effort basis, and/or combinations thereof. For example, a guaranteed status can provide that resources are available as resources are needed. A best effort basis status, for example, can provide that when resources are needed resources will be available if there are unallocated resources and if a higher priority task does not require the resources. For example, tasks A and B are running where task A is running as 100% guaranteed and task B is running as 100% best effort basis. If task A is using a resource and task B needs the same resource, task B would have to wait until the resource becomes available (e.g., task A stops running). However, if task B is using a resource and task A needs the same resource, task B would relinquish the resource and task A would use the resource.

That is, because task A is 100% guaranteed, task A will always have access to the necessary resources. In one or more examples of the present disclosure, the demand trace of each task can be partitioned across the criteria of the task. For example, the demand trace can be portioned across the BRE criterion, RRE criterion, and/or combinations thereof.

BRE and RRE criteria can be associated with a resource availability value. The resource availability can be based on the SLA chosen. Resource availability can be defined as a probability that a resource will be available at a particular time. The particular time can, for example, be the time a resource is requested for use. For example, a task that has 99.999% resource availability will have the resources it requests 99.999% of the time. That is, the task will have to wait for the resources it requests 0.001% of the time. The greater the resource availability value the greater the likelihood the resources will be available upon request.

Resource availability can also be a factor in priority. Priority between tasks within a CoS level can be determined through resource availability. A task with higher resource availability can be given priority over a task with lower resource availability. For example, a task that is 100% guaranteed and has 99.999% resource availability has priority over a task that is 100% guaranteed and has 95.0% resource availability. Likewise, a task that is 100% best effort basis and has 95.0% resource availability, for example, has priority over a task that is 100% best effort basis and has 90.0% resource availability. However, a task that is 100% guaranteed and has 95% resource availability will have priority over a task that is 100% best effort basis and has 99.999% resource availability, because 100% guaranteed has priority over 100% best effort regardless of resource availability. If, for example, a higher priority task meets a resource availability requirement (e.g., 95%), resources may be used by a lower priority task to ensure that the lower priority task also meets an availability requirement. A higher priority task need not always have access to a resource if the higher priority task only serves to exceed the resource availability that was agreed upon with a customer. In one or more examples, a customer can choose to make criteria guaranteed status, best effort basis status, and/or combination thereof.

For example, a SLA can have three CoS levels: Platinum; Gold; and Silver. A Platinum CoS can be defined as a BRE that is 75% guaranteed and a RRE that is 25% guaranteed, both with a resource availability of 99.999%. That is, 75% of the demands can be said to fall within the BRE and 25% within the RRE. For example, a threshold can be chosen such that all demands below the threshold correspond to BRE and all those above correspond to RRE. Such a threshold can be chosen so that the total aggregate of the BRE demands are expected to be 75% of the total demands. In one or more examples, a partitioning approach can be performed using percentiles of demand so that up to the expected 75-percentile of demand is considered to be BRE with anything above the expected 75-percentile of demand corresponding to RRE. The Gold CoS can be defined as a BRE that is 75% guaranteed with a 99.999% resource availability and a RRE that is 25% best effort basis with a 95.0% resource availability. The Silver CoS can have a BRE that is 50% best effort basis and a RRE that is 50% best effort basis both with a 95.0% resource availability. Table 1 shows a summary of the present example.

TABLE 1

Exemplary SLA.

| SLA Type | Base Resource Entitlement | Reserved Resource Entitlement | Resource Availability |
|---|---|---|---|
| Platinum | 75% guaranteed | 25% guaranteed | 99.999% |
| Gold | 75% guaranteed | 25% best effort | 99.999% (BRE)/ 95.0% (RRE) |
| Silver | 50% best effort | 50% best effort | 95.0% |

Once the tasks have been defined by as CoS level of a SLA, the CoS level with the highest priority can be selected at step 224. For example, the Platinum CoS can have priority over the Gold CoS and the Gold CoS can have priority over the Silver CoS. Priority between CoS can be determined by comparing BRE and RRE criteria. Further, a CoS level that is 100% guaranteed status has priority, for example, over a CoS level that is 100% best effort status. If two tasks have the same CoS level and resource availability then a task can be selected randomly, for example.

The tasks within the selected CoS level can be load-balanced across a pool of servers at step 226. Load-balancing can be the distribution of tasks (e.g., tasks assigned to VMs) across servers such that the workload can be shared among the servers. Load-balancing can, for example, include assigning tasks to servers of the pool of servers. For example, in load-balancing exercise, consideration can be given to the tasks that have previously been assigned to the servers and to the tasks that are being load-balanced. Load-balancing, for example, can include analyzing a demand trace of each task to determine a distribution of the number of tasks across the pool of servers.

A demand trace can indicate the resources required for a task. A demand trace can correspond to the task and be used to represent resource requirements of the task during load balancing exercises. A demand trace can be associated with and partitioned across BRE and RRE criteria of a task. In one or more examples, before load-balancing, one or more of the servers of the pool of servers can be consolidated into a set of servers that are part of a cloud environment.

At least a portion of the RRE criteria of the number of tasks are removed from the demand trace of the number of tasks within the selected CoS level, at 228. In one or more example, the demand trace of RRE criteria of a selected CoS level can be removed while the demand trace of the BRE criteria is maintained. In an example, removing a demand trace of RRE criterion of a task no longer accounts for its demands on the physical server where its task must reside. In one or more example of the present disclosure, removal of the RRE criteria from a demand trace can be based on a resource availability value. For example, RRE criteria below a threshold resource availability value can be removed from the demand trace. The threshold resource availability value, in an example, can be selected by a customer and/or affect pricing of certain CoS levels.

In one or more example, double booking of RRE criteria can occur during load-balancing. For example, double booking can be the assignment of two different tasks to the same resources (e.g., server). Further, double booking can include more than one VM assigned to a server during load-balancing. Double booking can conserve resources by allowing two tasks to share the same resource allocation. For example, a first task with priority over a second task can be double booked with the second task to share a resource. Double booking can also conserve resources when a first task and a second task are not expected to fully use the resources that are reserved for them individually. Further, double booking is not limited to only two tasks sharing resources. A first task, for example, defined as RRE can be double booked with a second task defined as RRE and a third task defined as RRE. In a different example, a first task defined as BRE can be double booked with a second task defined as RRE and a third class defined as RRE. Double booking can, for example, occur after a RRE resource has been removed from a demand trace, consequently allowing additional tasks to be assigned to the same resource during a load balancing exercise.

The selecting 224, load-balancing 226, and removing 228 steps can be repeated for lower priority CoS levels, until no more CoS levels remain, at step 230. When lower priority CoS levels are subsequently load balanced, for example, the tasks of higher CoS levels assigned with must-reside variables assure criteria remain reserved at the assigned resources. In one or more examples, RRE criteria that have had been removed from a demand trace are doubled booked during subsequent lower CoS level load balancing because the resources that were assigned the higher CoS level RRE criteria.

Figure 3:
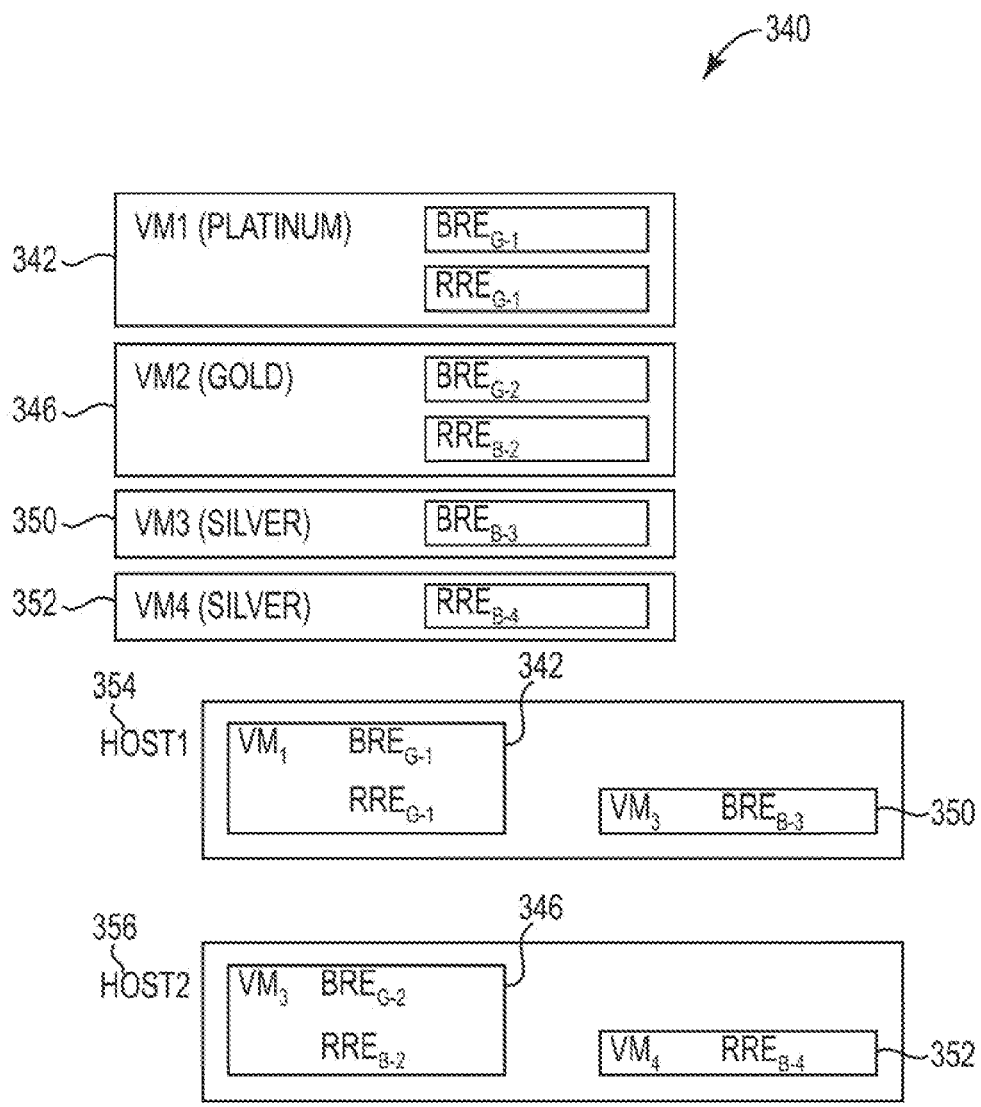
FIG. 3 illustrates an example iteration of the method virtual machine placement according to the present disclosure.

FIG. 3 illustrates example iterations 340 of a method for virtual machine placement according to the present disclosure. In FIG. 3, the subscript in $BRE_{G-1}$ contains a letter and a number. The letter in the subscript denotes the guaranteed status. 'G' denotes guaranteed and 'B' denotes best effort basis. The numbers in the subscript denote the task. The number '1' denotes the first task, the number '2' denotes the second task, the number '3' denotes the third task, and the number '4' denotes the fourth task. A $RRE_{G-1}$ denotes a RRE that is guaranteed and derives from the first task. A $BRE_{B-3}$ denotes a BRE that is best effort basis and derives from a third task. A $RRE_{B-2}$ denotes a RRE that is best effort basis and derives from a second task.

In FIG. 3, four tasks are assigned to VMs. The first task is in Platinum CoS with a $BRE_{G-1}$ and a $RRE_{G-1}$. The subscript G represents that the criterion are guaranteed status. The subscript 1 represents the task the criterion is associated with in the present example. VM1 342 contains the $BRE_{G-1}$ portion of the first task and the $RRE_{G-1}$ portion of the first task. The second task is defined within a Gold CoS with a $BRE_{G-2}$ that is guaranteed status and a $RRE_{B-2}$ that is best effort basis status, as denoted by the B subscript. VM2 346 includes the $BRE_{G-2}$ and the $RRE_{B-2}$ criteria of the second task. The third task is within a Silver CoS with a $BRE_{B-3}$ that is best effort basis status. VM3 350 is the third task. The fourth task is within the Silver CoS level with a $BRE_{B-4}$ that is best effort basis status. VM4 352 is the fourth task. The current example also includes two servers which are used to host the VMs; host 1 354 and host 2 356.

During a first iteration of the present disclosure Platinum CoS can be selected as it has the highest priority CoS level. In FIG. 3, the Platinum CoS contains the first task that is assigned to VM1 342. VM1 is load-balanced across the servers. In FIG. 3, VM1 is assigned to host 1 354, including task 1, a Must-reside variable of task 1, and a demand trace of task 1 partitioned across $BRE_{G-1}$ and a $RRE_{G-1}$. Once VM1 has been assigned the RRE criteria within the Platinum CoS level are removed from the demand trace. That is, demand trace of the RRE resources is removed for subsequent load balancing stages so that double booking of RRE resources can take place. The RRE resources are removed because the task may not use the resources, hence the resources can be double booked for the demands with lower priority tasks. The BRE criteria are not removed from the demand trace. Since there are two more CoS levels remaining, the method is repeated (e.g., FIG. 2, 224).

During a second iteration of the present disclosure, the Gold CoS level is selected. The Gold CoS level contains the second task on VM2 346. VM2 holds the $BRE_{G-2}$ and the $RRE_{B-2}$ criteria of the second task. VM2 is load-balanced and assigned to host 2 356. The second task on VM2 346 includes a must-reside variable and a demand trace partitioned across the $BRE_{G-2}$ and the $RRE_{B-2}$ criteria. For subsequent load balancing exercises the demand traces of the Gold CoS level task is updated by removing the demand trace of the $RRE_{B-2}$ criteria. As depicted in FIG. 3, the subsequent load-balancing exercise of the Gold CoS level did not re-assign the VM1. VM1 is not re-assigned to a different server because of the must-reside variable of task 1 on VM1. Since there is one more CoS level remaining, the method is repeated selecting the final CoS level, Silver.

During a third iteration of the present disclosure the Silver CoS level is selected. The Silver CoS contains two tasks; the third task and the fourth task. VM3 350 holds the third task with $BRE_{B-3}$ criteria. VM4 352 holds the fourth task with $RRE_{B-4}$ criteria. Tasks 3 and 4 each include a must-reside variable and a demand trace. In the load-balancing step VM3 is assigned to host 1 354 and VM4 is assigned to host 2 356. VM3 350 is double booked with VM1 342. The double-booking of VM1 and VM3 is possible because the demand trace of $RRE_{G-1}$ was removed previously. VM4 352 is double booked with VM2 346. The double-booking of VM2 with VM4 is possible because the demand trace of $RRE_{B-2}$ was removed. The demand trace of the resources occupied by VM4 within Host 2 356 is removed as it is a RRE criterion. Since no more CoS levels remain, the method concludes (e.g., FIG. 2, 240).

In one or more examples, the status of the criteria within a task can be customer defined. Decisions on what status a criteria should be can, for example include, but are not limited to, cost considerations, resource availability considerations, priority of the task associated with the criteria, and/or combinations thereof, etc.

Figure 4:
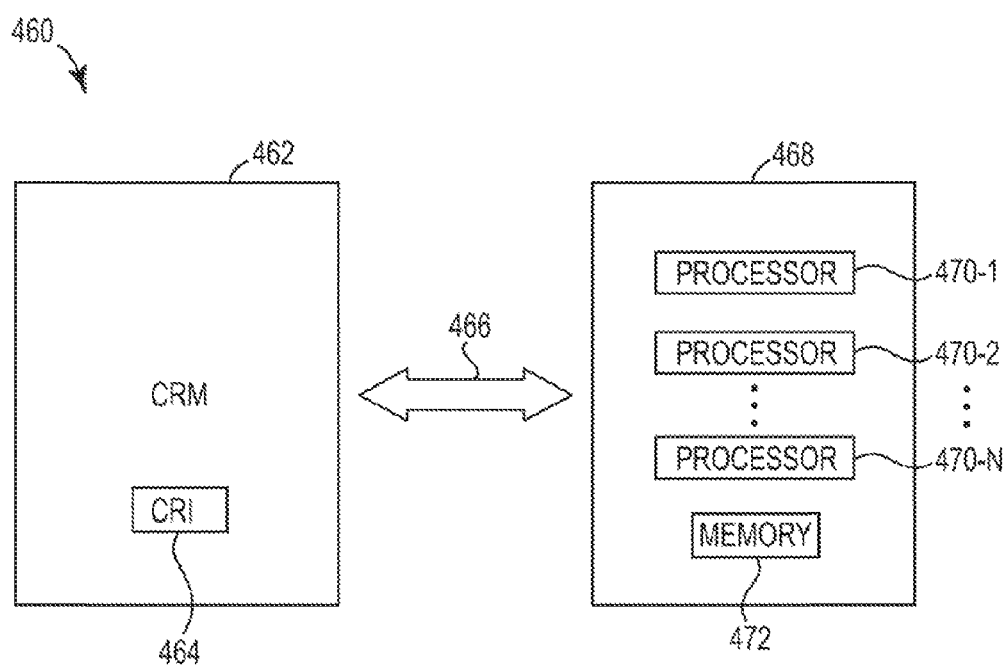
FIG. 4 illustrates a block diagram of an example of a computer-readable medium in communication with processing resources for virtual machine placement according to the present disclosure.

FIG. 4 illustrates a block diagram 460 of an example of a computer-readable medium (CRM) 462 in communication with a computing device 468, e.g., Java application server, having processor resources of more or fewer than 470-1, 470-2 . . . 470-N, that can be in communication with, and/or receive a tangible non-transitory computer readable medium (CRM) 462 storing a set of computer readable instructions 464 executable by one or more of the processor resources (e.g., 470-1, 470-2 . . . 470-N) for SLA aware VM placement, as described herein. The computing device may include memory resources 472, and the processor resources 470-1, 470-2 . . . 470-N may be coupled to the memory resources 472.

Processor resources can execute computer-readable instructions 464 that are stored on an internal or external non-transitory computer-readable medium 462. A non-transitory computer-readable medium (e.g., computer readable medium 462), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, digital video discs (DVD), high definition digital versatile discs (HD DVD), compact discs (CD), and/or a solid state drive (SSD), flash memory, etc., as well as other types of machine-readable media.

The stored instructions may be an installed program or an installation pack. If the stored instructions are an installation pack, the non-transitory computer-readable medium, for example, can be managed by a server such that the installation pack can be downloaded. The non-transitory computer readable medium can also be a portable medium, such as a DVD, CD, flash drive, etc The non-transitory computer-readable 462 medium can be integral, or communicatively coupled, to a computing device, in either in a wired or wireless manner. For example, the non-transitory computer-readable medium can be an internal memory, a portable memory, a portable disk, or a memory located internal to another computing resource (e.g., enabling the computer-readable instructions to be downloaded over the Internet).

The CRM 462 can be in communication with the processor resources (e.g., 470-1, 470-2 . . . 470-N) via a communication path 466. The communication path 466 can be local or remote to a machine associated with the processor resources 470-1, 470-2 . . . 470-N. Examples of a local communication path 466 can include an electronic bus internal to a machine such as a computer where the CRM 462 is one of volatile, non-volatile, fixed, and/or removable storage medium in communication with the processor resources (e.g., 470-1, 470-2 . . . 470-N) via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 466 can be such that the CRM 462 is remote from the processor resources (e.g., 470-1, 470-2 . . . 470-N) such as in the example of a network connection between the CRM 462 and the processor resources (e.g., 470-1, 470-2 . . . 470-N). That is, the communication path 466 can be a network connection. Examples of such a network connection can include a local area network (LAN), a wide area network (WAN), a personal area network (PAN), and the Internet, among others. In such examples, the CRM 462 may be associated with a first computing device and the processor resources (e.g., 470-1, 470-2 . . . 470-N) may be associated with a second computing device (e.g., a Java application server).

In an example, processor resources 470-1, 470-2 . . . 470-N coupled to the memory 472 can receive a request to place a VM. The resource requirements for the VM can be determined. The demand trace can be consulted to determine the next available host for the VM. The VM can then be placed on the selected host. The VM can be assigned to the host. The demand trace can be updated by removing the resources that are no longer available. The demand trace can then be updated by adding to it the resources that can be double booked.

Although specific examples have been illustrated and described herein, those of ordinary skill in the art will appreciate that an arrangement calculated to achieve the same results can be substituted for the specific examples shown. It is to be understood that the above description has been made in an illustrative fashion, and not a restrictive one. Examples set forth in this specification are not intended to be limiting and merely set forth some of the many possible examples for the claimed system and method for resource skill compliance optimization.

What is claimed:

1. A method comprising:
defining a user's demands on execution of a number of tasks, each task including a demand trace, as Service Level Agreement (SLA) information, the SLA comprised of one or more Class of Service (CoS) levels where each of the one or more CoS levels is defined by a Base Resource Entitlement (BRE) criteria and a Reserved Resource Entitlement (RRE) criteria, wherein:
the BRE criteria specifies criteria for resource reservations for the number of tasks according to an expected resource usage of the number of tasks; and
the RRE criteria specifies criteria for resource reservations for the number of tasks beyond the expected resource usage;
selecting a highest CoS level of the one or more CoS levels;
load-balancing the number of tasks within the selected CoS level across a pool of servers;
removing at least a portion of the RRE criteria of the number of tasks from the demand trace of the selected CoS level; and
repeating the selecting, load-balancing, and removing until there are no more CoS levels.

2. The method of claim 1, further comprising assigning each of the number of tasks to a virtual machine.

3. The method of claim 1, further comprising partitioning the demand trace of each task across the BRE criteria and the RRE criteria of each task.

4. The method of claim 1, wherein load-balancing the number of tasks includes analyzing the demand trace of each task to determine a distribution of the number of tasks across the pool of servers.

5. The method of claim 1, wherein load-balancing the tasks within the selected CoS level includes double booking the RRE criteria.

6. The method of claim 1, wherein removing the demand trace of at least a portion of the RRE criteria within the selected CoS level further includes basing the removal of the portion of the RRE on historical resource usage data.

7. The method of claim 1, comprising consolidating, before load-balancing, one or more servers into a set of servers that are part of a cloud environment.

8. The method of claim 1, comprising removing at least a portion of the RRE criteria from the demand trace while maintaining the BRE criteria in the demand trace.

9. A non-transitory computer-readable medium comprising computer-readable instructions stored thereon that, when executed by one or more processors, cause the one or more processors to:
define a user's demands on execution of a number of tasks, each task including a demand trace, as Service Level Agreement (SLA) information, the SLA comprised of one or more Class of Service (CoS) levels where each of the one or more CoS levels is defined by a Base Resource Entitlement (BRE) criteria and a Reserved Resource Entitlement (RRE) criteria, wherein:
the BRE criteria specifies criteria for resource reservations for the number of tasks according to an expected resource usage of the number of tasks; and
the RRE criteria specifies criteria for resource reservations for the number of tasks beyond the expected resource usage;
designate a status of the BRE and RRE criteria of each CoS level;
assign the number of tasks to a number of virtual machines (VMs);

select a VM with a highest priority CoS level from the number of VMs;
load-balance the selected VM across a pool of servers;
remove the demand trace of at least a portion of the RRE criteria of the selected VM; and
repeat the select, load-balance, and remove instructions until there are no more VMs to select from the number of VMs.

10. The non-transitory computer-readable medium of claim 9, comprising computer-readable instructions stored thereon that, when executed by one or more processors, cause the number of processors to:
load-balance more than one VM to a server if the server has a VM assigned with at least a portion of the demand trace removed.

11. The non-transitory computer-readable medium of claim 9, wherein the status of each of the BRE criteria and the RRE criteria contains a guaranteed status or a best effort basis status.

12. The non-transitory computer-readable medium of claim 9, comprising computer-readable instructions stored thereon that, when executed by one or more processors, cause the one or more processors to:
assign the BRE criteria and the RRE criteria each a resource availability value.

13. The non-transitory computer-readable medium of claim 12, wherein the instructions to remove the demand trace of the portion of the selected VM include instructions to remove the portion of the demand trace if the resource availability value of the assigned RRE criteria is below a threshold resource availability value.

14. The non-transitory computer-readable medium of claim 9, wherein the instructions to remove the demand trace of at least a portion of the RRE criteria of the selected VM include instructions to maintain a demand trace of the BRE criteria of the selected VM.

15. A system comprising:
a memory operable to store executable instructions; and
a processor coupled to the memory, wherein the processor executes the executable instructions to:
define a users demands on execution of a number of tasks, each task including a demand trace and a must-reside variable, as Service Level Agreement (SLA) information, the SLA comprised of one or more Class of Service (CoS) levels where each of the one or more CoS levels is defined by a Base Resource Entitlement (BRE) criteria and a Reserved Resource Entitlement (RRE) criteria, wherein:
the BRE criteria specifies criteria for resource reservations for the number of tasks according to an expected resource usage of the number of tasks; and
the RRE criteria specifies criteria for resource reservations for the number of tasks beyond the expected resource usage;
partition the demand trace of each task across the BRE criteria and the RRE criteria of each task;
designate a status of the BRE and RRE criteria of each CoS level;
select a highest CoS level of the one or more CoS levels;
load-balance the number of tasks within the selected CoS level across a pool of servers;
remove at least a portion of the RRE criteria of the number of tasks from the demand trace of the selected CoS level; and
repeat the selecting, load-balancing, and removing until there are no more CoS levels.

16. The system of claim 15, wherein the must-reside variable ensures that tasks with BRE criteria are not load balanced across the pool of servers more than once.

17. The system of claim 15, wherein the number CoS levels represent a number of price points for the user.

18. The system of claim 15, wherein the processor is to execute the executable instructions to remove at least a portion of the RRE criteria of the number of tasks from the demand trace while maintaining the BRE criteria in the demand trace.

* * * * *